(12) United States Patent
Sinclair et al.

(10) Patent No.: US 6,353,224 B1
(45) Date of Patent: Mar. 5, 2002

(54) MILLIMETER WAVE IMAGING APPARATUS

(75) Inventors: Gordon N Sinclair, Malvern; Alan H Lettington, Reading, both of (GB)

(73) Assignee: The Secretary of State for Defence in Her Britannic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/341,018

(22) PCT Filed: Jan. 9, 1998

(86) PCT No.: PCT/GB98/00005

§ 371 Date: Jul. 1, 1999

§ 102(e) Date: Jul. 1, 1999

(87) PCT Pub. No.: WO98/32035

PCT Pub. Date: Jul. 23, 1998

(30) Foreign Application Priority Data

Jan. 17, 1997 (GB) .............................................. 9700966

(51) Int. Cl.[7] ................................................ G01S 13/89
(52) U.S. Cl. .................... 250/336.1; 250/332; 250/334; 342/179
(58) Field of Search ............................. 250/336.1, 332, 250/334; 342/179

(56) References Cited

U.S. PATENT DOCUMENTS

| | | |
|---|---|---|
| 3,784,899 A | 1/1974 | Chalfin |
| 5,073,782 A | * 12/1991 | Huguenin et al. .......... 342/179 |
| 5,760,397 A | * 6/1998 | Huguenin et al. .......... 250/332 |

OTHER PUBLICATIONS

Currie, Infrared and Millimeter–Wave Sensors for Military Special Operations and Law Enforcement Applications, International Journal of Infrared and Millimeter Waves, vol. 17, No. 7, Jul. 1, 1996, pp. 1117–1138.

Nadimi et al, "Preliminary Evaluation of a Millimeter–Wave System for Air Pollution Monitoring", IGARSS 1996, International Geoscience and Remote Sensing Symposium, Remote Sensing for a Sustainable Future, Lincoln, NE, May 28–31, 1996, vol. 2, May 28, 1996, pp. 863–865.

\* cited by examiner

*Primary Examiner*—Constantine Hannaher
*Assistant Examiner*—Andrew Israel
(74) *Attorney, Agent, or Firm*—Nixon & Vanderhye P.C.

(57) ABSTRACT

Millimeter wave imaging apparatus for use, in articular, as an indoor security system to identify objects concealed under the clothing of a person in a background scene, including means for generating a millimetric temperature contrast between the person to be imaged and the surroundings in scene. This may be a "hot" or "cold" source for producing a flux, and a relatively smaller flux respectively, of incoherent millimeter wavelength radiation. The apparatus may also include at least one partial ellipsoid reflective enclosure for reflecting millimeter wavelength radiation emitted from the "hot" and "cold" source so as to generate non-localized and uniform illumination of the person. The enclosure may have a metallic inner surface on which a dimpled pattern may be embossed to diffuse the millimeter wavelength radiation reflected from the metallic inner surface. The apparatus also includes one or more millimeter wavelength imaging cameras for detecting the millimeter wavelength radiation at one or more millimeter wave center frequencies, which may be mounted inside or outside the reflective enclosure. An image of the objects may be generated on a television monitor from the detected radiation.

34 Claims, 5 Drawing Sheets

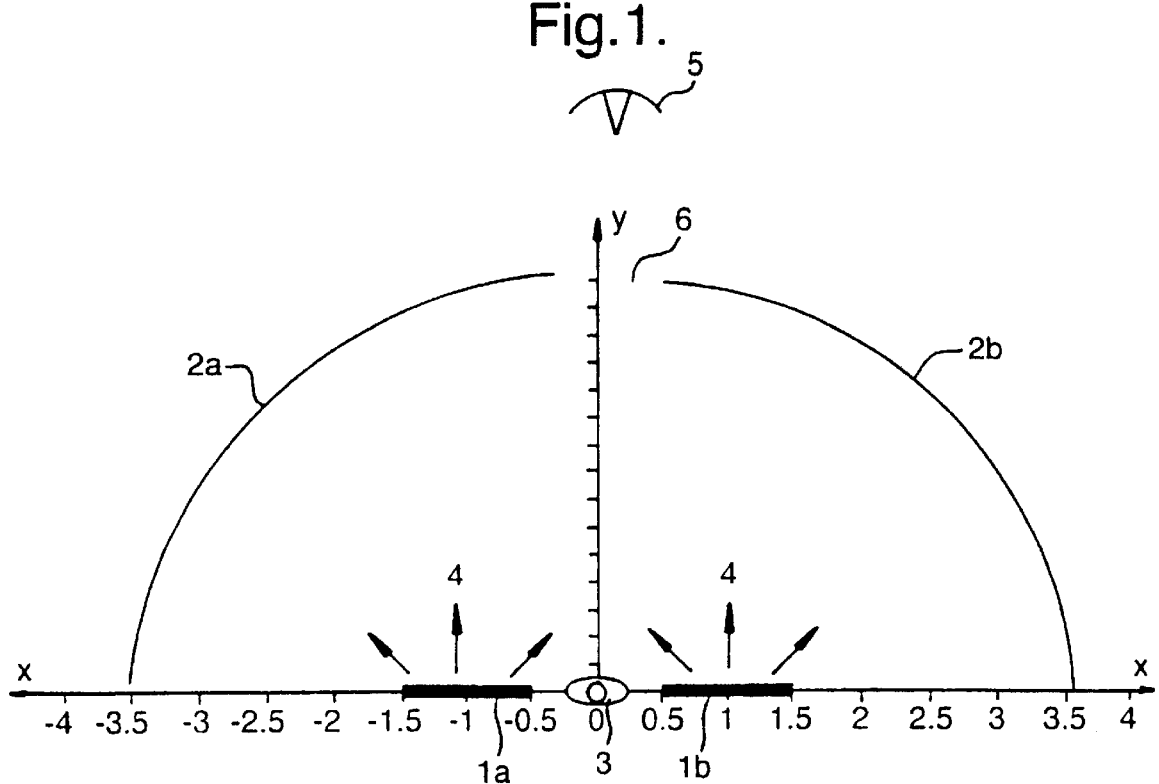
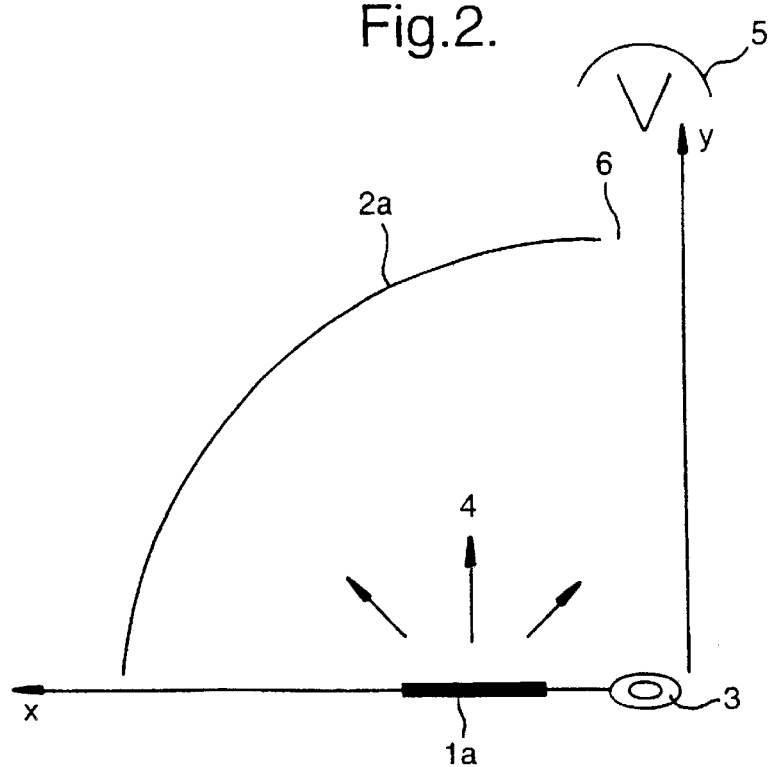

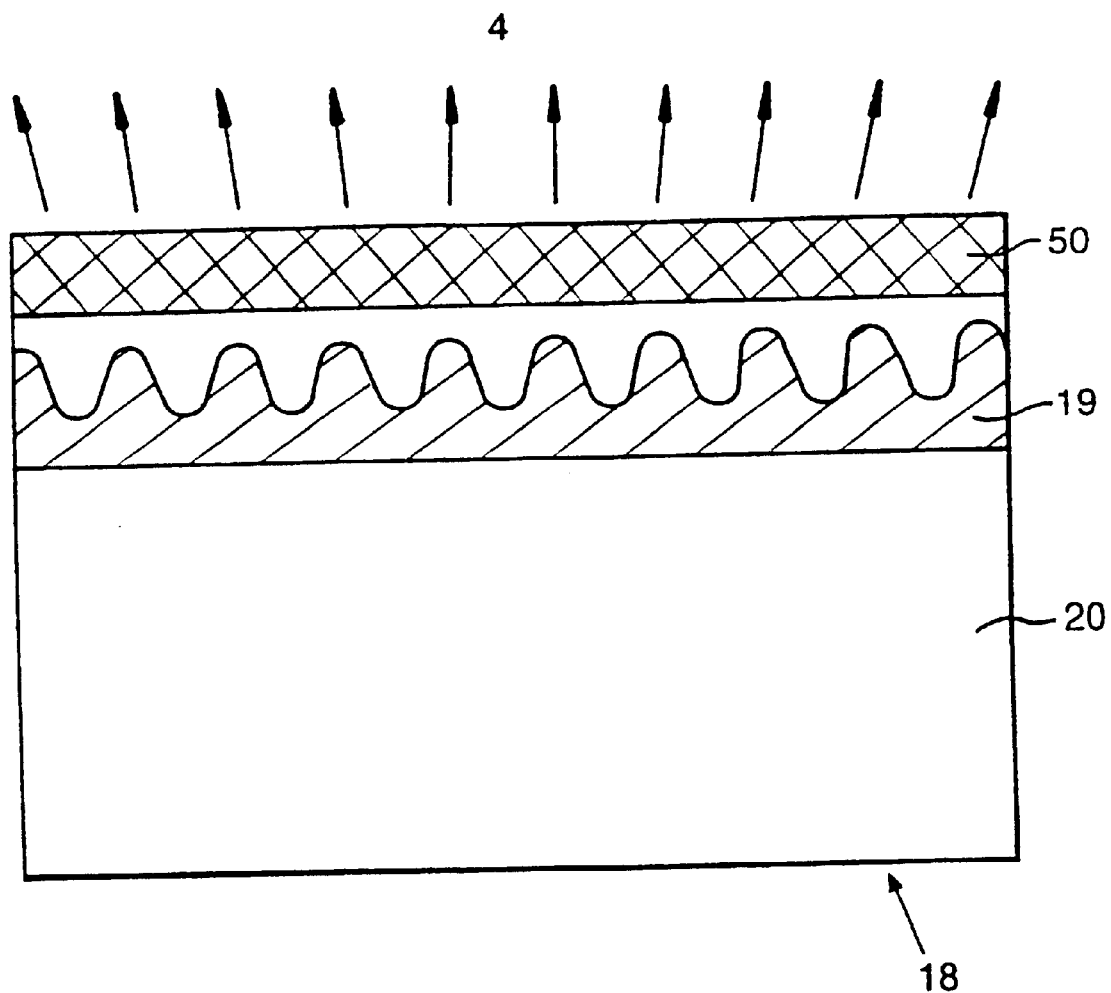

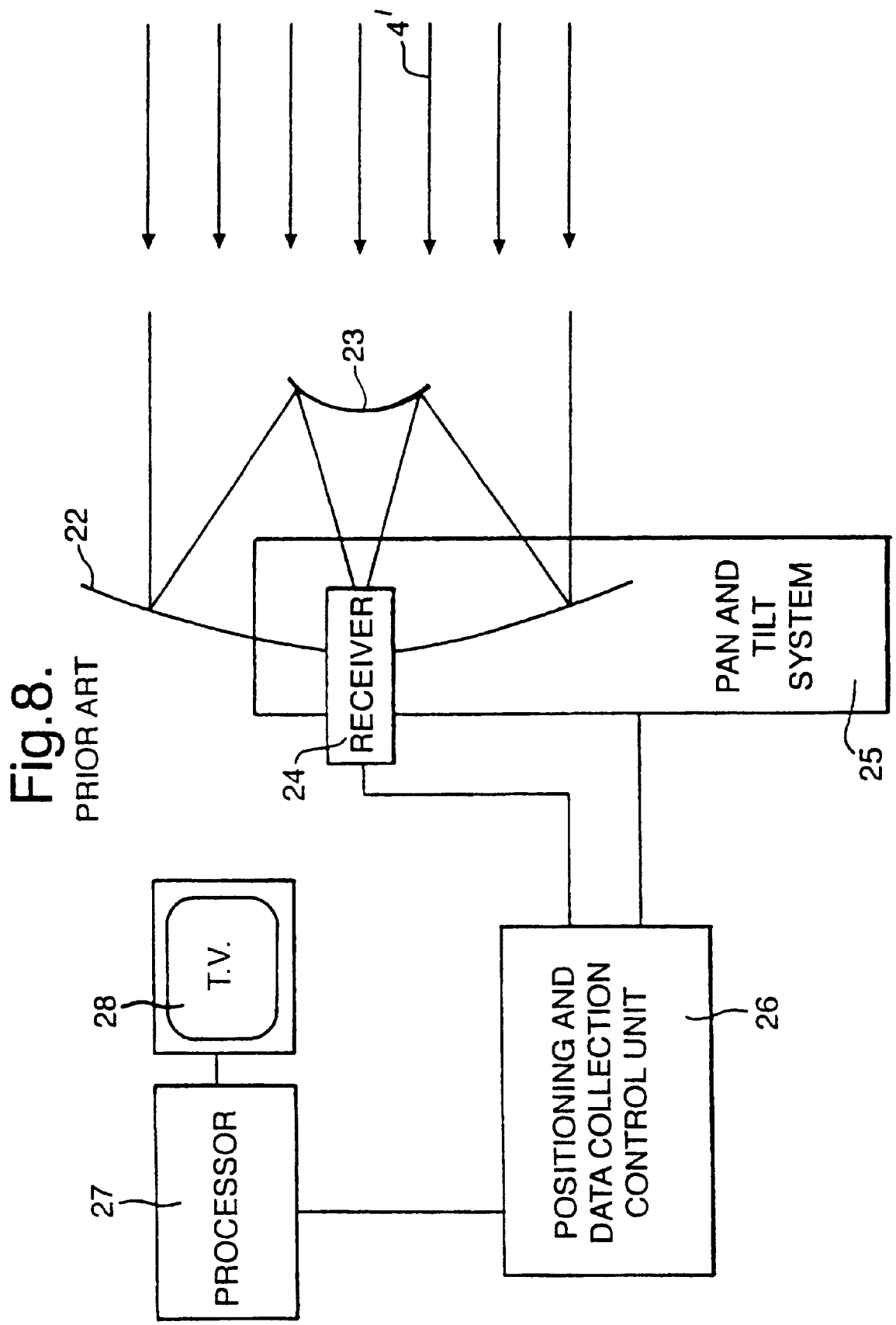

MILLIMETER WAVE IMAGING APPARATUS

BACKGROUND OF THE INVENTION

1. Field of the Invention

The invention relates to millimetre wave imaging apparatus which may be used to identify objects concealed under clothing and, in particular, may be used in an indoor environment. The system may be of particular use as a security system for use in an airport.

2. Discussion of Prior Art

Existing techniques based on soft X-rays give good resolution but tend to be a health risk to those who are repeatedly exposed to the scanner, in particular the airport staff. A passive system is advantageous in that it avoids harmful emission. Furthermore, security systems typically used in airports, such as metal detector wands and archways, are unable to detect non-metallic objects such as explosives.

Millimetre waves have the property of passing through clothing and can therefore be used to create images of a person's body and image items concealed beneath clothing. Passive millimetre wave imaging is a technique which uses emission and reflection from objects, and transmission through objects, of electromagnetic radiation in the millimetre wavelength region to construct an apparent temperature map or image of a scene or a person. The term passive imaging is usually used to describe imaging processes for which the levels of emission are comparable with natural background emission.

Using a millimetre wave imaging camera, images which have been recorded outdoors of a person concealing a gun beneath clothing clearly show the gun to be visible, since it reflects the cold sky temperature whereas the person's apparent temperature is much closer to that of the surroundings. Other materials which have different properties from the skin of a person appear to have different temperatures from the person and so are visible in a millimetre wave image.

The image is built up of pixels which record the irradiance of electromagnetic radiation from a scene, which is focused onto one or more radiometers which may be scanned over a scene. The technique is particularly good at distinguishing metallic from non-metallic objects as metal is highly reflective at millimetre wavelengths whereas other materials tend to have much lower reflectivities.

Good millimetre wave imagery relies on suitable illumination of the subject. This is readily achieved outdoors, as the sky provides a suitable source of illumination, but in an indoor environment, such as an airport, this is not possible.

U.S. Pat. No. 5,227,800 describes a millimetre wave imaging system comprising an incoherent source of millimetre radiation, in the form of an array of Gunn diodes, each of which itself emits coherent radiation. The variations in manufacturing tolerances across the array of diodes provide the substantially incoherent radiation source. The system relies on illuminating panels consisting of many Gunn diodes to provide an illumination solid angle. However, in order to fully illuminate the subject from a full front hemisphere a large number of diodes are required. Additionally, as each diode is a point source, this leads to glints in the resultant image where radiation is specularly reflected from materials in the scene. Furthermore, as each diode is itself coherent, specular reflections may cause interference effects and hence speckle in the resultant image.

The present invention relates to millimetre wave imaging apparatus which overcomes these problems.

SUMMARY OF THE INVENTION

According to the present invention, apparatus for detecting at least one object having a millimetric temperature, situated in background surroundings having a background millimetric temperature, comprises;

means for varying the background millimetric temperature, so as to generate a contrast between the background millimetric temperature and the millimetric temperature of at least one object, and detection means for detecting the contrast between the background millimetric temperature and the millimetric temperature of at least one object.

In one embodiment of the invention, the means for varying the background millimetric temperature may comprise;

at least one source, having an emitting surface, for emitting substantially incoherent millimetre wavelength radiation and reflection means for reflecting millimetre wavelength radiation emitted by the source, such that the object is illuminated substantially uniformly with millimetre wavelength radiation.

The system may be used as a security system to identify items concealed under clothing, such as may be used in an airport or customs control point. The system provides an advantage over the prior art in that the emitting source can be made quite small and the resultant image does not suffer from glints where radiation is specularly reflected from materials in the scene. Furthermore, the bulk of the illumination solid angle may be provided by a cheap reflective material.

The reflection means may comprise an enclosure having a reflective inner surface. Preferably, the enclosure is a partial ellipsoid and the reflective inner surface may be embossed with a dimpled pattern, such that millimetre wavelength radiation reflected from the reflective inner surface is diffused.

In an alternative embodiment of the invention, the means for varying the background millimetric temperature may comprise at least one source having an emitting surface for emitting substantially incoherent millimetre wavelength radiation, wherein the emitting surface forms part of the enclosure, such that the object is illuminated substantially uniformly with millimetre wavelength radiation. For example, in this embodiment the enclosure may be a cubicle having at least one side formed from the emitting surface of the source.

The detection means in any embodiment of the invention may comprise at least one millimetre wave imaging camera for detecting millimetre wavelength radiation reflected from and emitted by at least one object. In one arrangement, the apparatus may comprise a single millimetre wave imaging camera having at least one millimetre wave centre frequency and bandwidth of operation. In an alternative arrangement, the apparatus may comprise two or more millimetre wave imaging cameras, wherein the imaging cameras have substantially different millimetre wave centre frequencies of operation. The one or more millimetre wave imaging camera may be mounted inside or outside the enclosure, although it may be preferable to mount it within the enclosure.

The one or more millimetre wave imaging camera may have an associated processor and television monitor for generating a millimetre wavelength image of at least one object.

In one embodiment of the invention, the source may comprise;

a layer of emissive material, having an optical thickness t, for emitting millimetre wavelength radiation and heating means for increasing the temperature of the layer of emissive material, whereby increasing the temperature of the layer of emissive material gives rise to an increase in the background millimetric temperature.

The heating means may comprise at least one heating element.

The source may also comprise a metal layer, wherein the metal layer and the layer of emissive material form a structure having an emissivity, $\epsilon$, in the millimetre wavelength region, and wherein the optical thickness, t, of the layer of emissive material is such that the emission of millimetre wavelength radiation from said structure is substantially maximised.

The emissivity, $\epsilon$, of the structure may be between 0.5 and 1 and, preferably may be substantially equal to 1. For example, the metal layer may be aluminium and the emissive material may be any one of clay tiles, asbestos fire blanket or fire cement.

The source may further comprise insulation means for reducing the emission of infrared radiation from the source. The insulation means may comprise a fibreglass mat. The source may also include at least one additional metal layer for internally reflecting millimetre wavelength radiation emitted from the emissive material, such that the emission of millimetre wavelength radiation from the emitting surface of the source may be substantially maximised.

In an alternative embodiment, the source may comprise;

a layer of material for emitting millimetre wavelength radiation and cooling means for decreasing the temperature of the emissive material, whereby decreasing the temperature of the layer of material gives rise to a decrease in the background millimetric temperature.

The source may also include a millimetre radiation transparent layer, such as a door, enclosing the emissive material. Typically, the layer of material may be radar absorbing material (RAM).

Alternatively, the source may comprise one or more Gunn diodes or a plurality of gas discharge noise sources for emitting substantially incoherent millimetre wavelength radiation. In addition, one or more optical elements may be included for diffusing the emitted millimetre wavelength radiation.

According to another aspect of the invention, a source for use in the millimetre wave imaging apparatus comprises;

a layer of emissive material, having an optical thickness t, for emitting millimetre wavelength radiation and heating means for increasing the temperature of the layer of emissive material, whereby increasing the temperature of the layer of emissive material gives rise to an increase in the background millimetric temperature.

BRIEF DESCRIPTION OF THE DRAWINGS

The invention will now be described, by example only, with reference to the following Figures in which;

FIGS. 1 and 2 show examples of the possible geometry of the millimetre wave imaging apparatus, FIGS. 6 and 7 show diagrams of a 'cold' source which may be used in the millimetre wave imaging apparatus of the invention and FIG. 8 shows a diagram of the basic design of a conventional millimetre wavelength imaging camera which may be used in the millimetre wave imaging apparatus of the invention.

DETAILED DISCUSSION OF PREFERRED EMBODIMENTS

Figure 3:
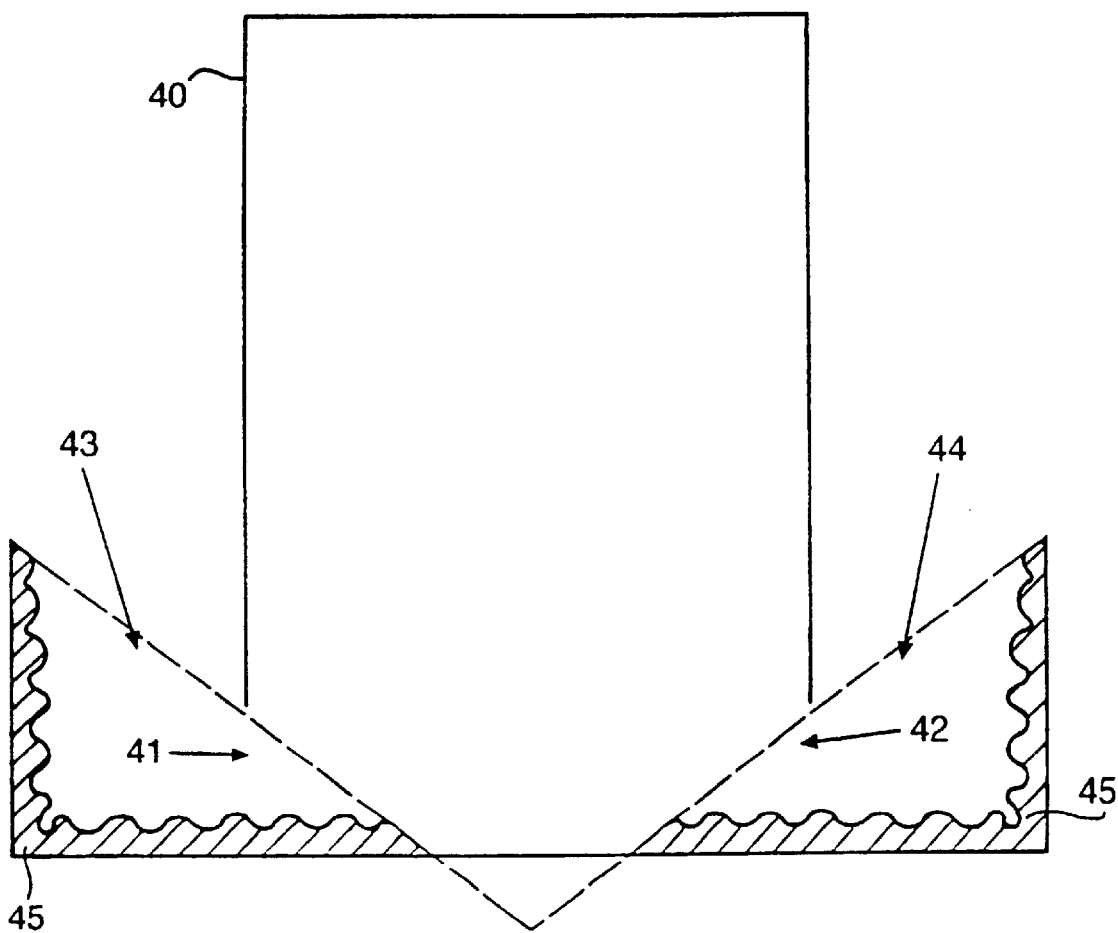
FIG. 3 shows a reflective enclosure in the form of a room, which may form part of the invention.

Referring to FIG. 1, the millimetre wave imaging system may comprise a source 1a and a reflective enclosure 2a. A second source 1b, preferably of the same design as the source 1a, may also be included and mounted within a second reflective dome 2b. The domes may be partial ellipsoids and one source may be situated at one of the foci of each of the ellipsoids 2a, 2b. The subject 3 to be imaged stands at the centre of the domed enclosure 2a, 2b, at the other foci of the partial ellipsoids.

The one or more sources 1a, 1b may emit millimetre wavelength radiation 4 towards the reflective enclosure 2a, 2b. This radiation bounces back and forth between the enclosure 2a, 2b and the subject 3 which is therefore illuminated with millimetre wavelength radiation 4. An imaging camera (imager) 5 is also included in the system to detect millimetre wave radiation reflected from the subject 3.

In addition, the subject 3 will also emit some millimetre wavelength radiation itself which is also detected at the imager 5. The radiation reflected from and emitted by the subject 3 may reach the imager 5 by passing through a window 6 in the enclosure. This window 6 causes some artefacts on the image of the body as it is a gap in the solid angle of illumination.

It may be preferable to mount the imager 5 within the reflective domes 2a, 2b, therefore removing the need for the window 6 and eliminating any artefacts. Depending on the focussing distance of the imager 5, this may necessitate a multiple mirror system, preferably mounted inside the domes 2a, 2b to focus millimetre wavelength radiation reflected from the subject 3 onto the imager 5.

The arrangement shown in FIG. 1 ensures that as much as possible of the millimetre wavelength radiation 4 emitted from the sources 1a, 1b is reflected from the domes 2a, 2b onto the subject 3 to be imaged from all angles that the reflections of the sources 1a, 1b fill. Furthermore, the geometry of the arrangement is such that radiation 4 emitted from the source 1a, 1b is distributed substantially uniformly over the subject 3 to be imaged. It is necessary to illuminate the subject 3 from all directions in order to avoid artefacts arising in the image of the subject 3 which correspond to any gaps in the illumination.

To ensure uniform illumination of the subject 3, it is important that the shape of the inner reflecting surfaces of the domes 2a, 2b are exact ellipsoids. However, in an alternative embodiment, the inside surface of the reflective domes 2a, 2b may be coated with a dimpled foil or the surface may be shaped directly. This produces a diffusing effect, in which case the shape of the domes 2a, 2b is less critical to the performance of the system. For example, this may allow the shape of the enclosure to be relaxed to that of a room, as described later. The preferred features of a dimpled surface will be described in more detail later.

The use of the diffusing foil lowers the energy flux reaching the subject 3 from all angles. It may therefore be preferable to cover the floor (in the position of the horizontal axis) and the back wall (in the plane of the diagram) with a metal so as to reflect as much radiation as possible back into the domed enclosure 2a, 2b. Floor covering may also be used with no diffusing foil on the reflecting surfaces of the domes 2a, 2b. The use of the reflective domes 2a, 2b ensures there is a large solid angle of illumination at the subject 3 i.e. non-localised illumination.

FIG. 2 shows an alternative arrangement of the system in which only one source 1 a is used, situated at one focus of a single partial ellipsoid dome 2a. Radiation reflected from the dome 2a illuminates the subject 3 at the centre of the ellipsoid as in the previous example. The side and back walls (y-z and x-z planes) and the floor (x-y plane) are preferably covered with a metal so as to ensure as much radiation as possible is reflected back into the enclosure, ultimately reaching the subject 3.

As described previously, it may be preferable to mount the imager 5 entirely within the enclosure 2a to eliminate any non uniform temperature leaking into the enclosure through a gap which is present for the imager to look through. A fully closed enclosure would enable maximum uniformity of illumination to be obtained. It would be possible to have openings in the enclosure, for example to allow persons access, providing the geometry were carefully controlled.

An example of a suitable enclosure geometry having openings is shown in FIG. 3. This shows a reflective chamber 40, in this case three walls of a room, with two openings 41, 42 in entrance and exit regions 43, 44 respectively, through which a person may enter and leave the chamber 40. An essential feature an open enclosure such as this is that the entrances regions are coated with emissive material 43, for example Radar Absorbing Material (RAM), at the same apparent temperature as the illumination chamber such that there is no way for radiation from outside the chamber to be reflected into the inside.

In an alternative embodiment of the invention, the reflective surfaces of any of the enclosures described above with reference to FIGS. 1, 2 and 3 may be replaced by millimetre wave emissive material or emissive sources, so that the subject is illuminated directly with incoherent radiation, rather than relying on reflection means. The emissive surfaces must be arranged to provide substantially uniform illumination of the subject, as is provided by the reflecting enclosures. The use of a partial enclosure, for example having only three walls or sides, is possible if emissive surfaces are used. For example, for a subject standing within a three-sided enclosure, each surface being coated with an emissive material, a fourth side behind the subject would not be essential. A partial or complete enclosure having emissive walls or sides is only likely to be practical in use if the enclosure is of a relatively small size, for example if the enclosure takes the form of a cubicle. For the purpose of this specification, the phrase "enclosure" is not intended to be limited to a completely enclosed volume of space.

Figure 4A:
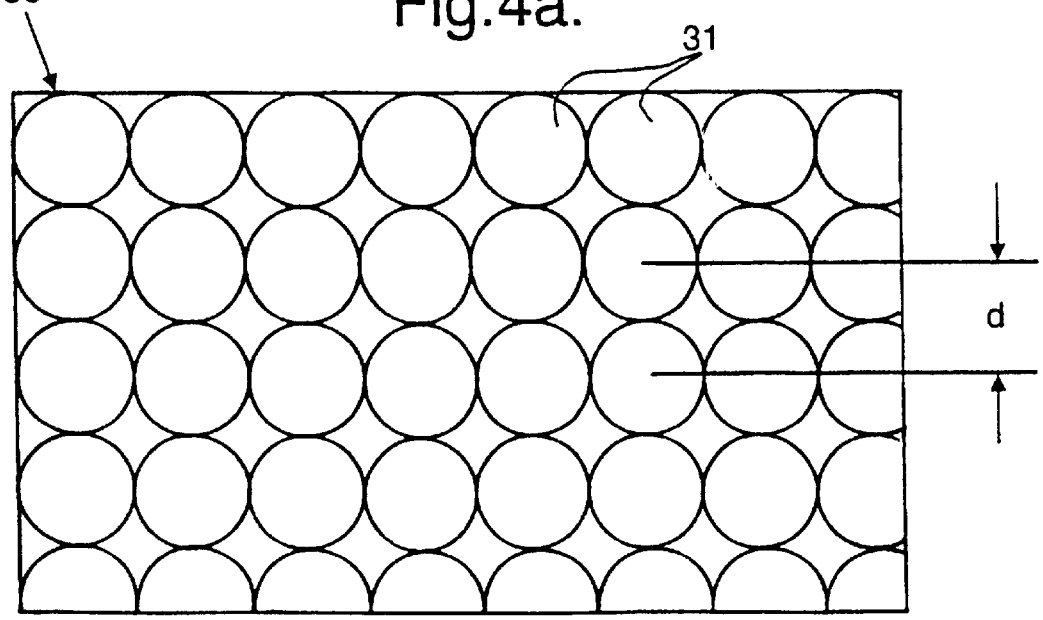
FIG. 4 shows (a) a plan view and (b) a side view of a dimpled surface of a reflective enclosure which may form part of the invention.
Figure 4B:
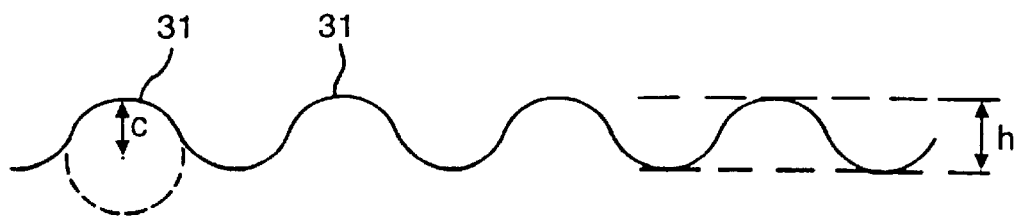

In a preferred embodiment of the invention, a dimpled foil may be applied to the surface of the reflecting enclosure, or the surface of the enclosure may be shaped directly in a dimpled pattern. FIGS. 4(a) and 4(b) show plan and side views respectively of a typical dimpled surface 30 which may be the shaped surface of the enclosure (e.g. the reflective domes 2a, 2b in FIG. 1) or may be provided by a separate covering applied to the enclosure surface. Typically, the dimples In a preferred embodiment of the invention, a dimpled foil may be applied to the surface of the reflecting enclosure, or the surface of the enclosure may be shaped directly in a dimpled pattern. FIGS. 4(a) and 4(b) show plan and side views respectively of a typical dimpled surface 30 which may be the shaped surface of the enclosure (e.g. the reflective domes 2a, 2b in FIG. 1) or may be provided by a separate covering applied to the enclosure surface. Typically, the dimples 31 in the surface may have a centre-to-centre separation (d) of between 1 mm and 40 mm, and preferably approximately 10 mm. Typically, each dimple may be spherical with a radius of curvature (c) of between 1 mm and 40 mm and a height (h) of between 1 mm and 20 mm, and preferably between 2 mm and 3 mm. Experimentally, with an ellipsoid enclosure, having a dimpled foil applied to the surface having dimples separated by 10 mm, with a dimple radius of curvature of 4 mm and a height (h) of 2.7 mm, good image contrast has been achieved.

A millimetre wavelength image of a scene depends on radiation received at the imaging camera due to the emission and reflection of millimetre wavelength radiation from the scene. For a given object within a scene, the emission of millimetre wavelength radiation is fixed and is dependent on the thermal temperature of the object and its millimetric emissivity. The reflection, however, can be altered as it is dependent on the millimetric temperature of the surrounding scene and the millimetric reflectivity of the object to be imaged.

The millimetre wavelength imaging system may be used, in particular, as a security system for identifying objects concealed under the clothing of a person. Using conventional millimetre wave imaging techniques, for concealed objects on a person's body there is little difference in observed millimetric temperatures of the body and object when the system is arranged so that the apparent temperature of the surroundings is close to that of the body and object. In order to make concealed objects more easily detectable, the millimetric temperature contrast (i.e. the variation of energy in the millimetre wavelength region) in the surroundings can be increased to enable the objects to be detected through differences in reflected radiation, which are potentially much larger than those due to emission differences. The concealed objects will therefore have an apparent temperature at variance from that of the skin of the person's body, enhancing the contrast between the concealed objects and person in the resulting millimetre wave image.

The apparent temperature of, for example, an object on a human body is given by;

$$T = \epsilon T_O + r T_S + t T_B \quad \text{Equation 1}$$

where $T_O$ is the temperature of the object, $T_S$ is the millimetric illumination temperature, $T_B$ is the temperature of the body behind the object and $\epsilon$, r and t are the emissivity, reflectivity and transmissivity of the object respectively. As any object concealed under clothing on the body will have a temperature very close to that of the body, $T_O = T_B$, and as $\epsilon + r + t = 1$, Equation 1 reduces to;

$$T = T_O - r(T_{O-TS})$$

For example, for an object at a temperature of 263 K having a reflectivity of 0.176 and illuminated by the sky at 156 K, the apparent temperature of the object is 240 K.

In order to change the millimetric temperature of the surroundings, a 'hot' source of millimetre wavelength radiation for producing a flux of substantially incoherent millimetre wavelength radiation may be used, for increasing the millimetric temperature of the surroundings. Alternatively, a 'cold' source for producing a relatively smaller flux, or substantially no flux, of incoherent millimetre wavelength radiation may be used, capable of reducing the millimetric temperature of the surroundings. Both a 'hot' and a 'cold' source will have the effect of generating a millimetric temperature contrast between the subject 3 to be imaged and the surroundings.

It is an essential property of the source 1a, 1b that radiation 4 emitted by the source is substantially incoherent within the bandwidth of operation of the millimetre wave imaging camera 5, as the detection of coherent radiation gives rise to interference fringes which affect the image quality. For the purpose of this application, the phrase "substantially incoherent" shall be taken to mean "substantially incoherent within the bandwidth of operation of the one or more millimetre wave imaging camera".

Figure 5:
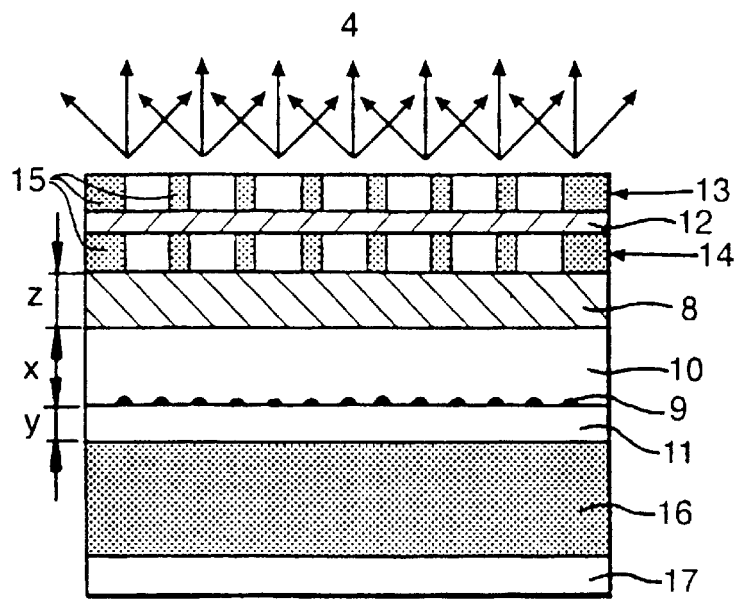
FIG. 5 shows a diagram of a 'hot' source which may be used in the millimetre wave imaging apparatus of the invention.

Referring to FIG. 5, a 'hot' source 7 may comprise a layer of material 8 for emitting incoherent millimetre wavelength radiation. The material 8 may be heated by means of a series of heating elements 9 sandwiched between two layers of aluminium 10, 11. By varying the temperature of the layer of material 8, the flux of millimetre wavelength radiation emitted from the material 8 may be varied.

Channels are milled the in the aluminium plate 10 in a pattern matching the shape of the element, to ensure a good thermal contact with heating elements 9. The plates 10, 11 may be made from aluminium or any other metal which has a high thermal conductivity. Typically, the upper plate 10 may be between 10 and 12 mm thick (x) and the lower plate 11 may be between 3 and 5 mm thick (y).

The hot source 7 also comprises a thin fibreglass mat 12 which is supported by two sheet insulation layers 13, 14 made of a high thermal insulating material. This layer arrangement 13, 12, 14 reduces the heat loss from the source 7 by radiation and conduction and is preferably transparent to millimetre wave radiation. The insulation layers 13, 14 may be drilled with holes 15 to let millimetre wavelength radiation 4 pass through.

The source 7 also includes a lower insulation layer 16, typically 50 mm thick, which may be constructed from the same material or material having the same properties as the insulation layers 13, 14, and a bottom aluminium plate 17, typically a few mm in thickness. The aluminium plate 17 primarily acts as a support structure, rather than a reflector, as all millimetre wavelength radiation emitted from the material 8 towards the aluminium plate 17 will be reflected by the aluminium plate 10 and will not reach the lower layers 16, 17.

The 'hot' source 7 is designed such that millimetre wave radiation emitted from the material 8 is substantially transmitted through the source towards layer 13, whilst infrared radiation is reflected internally so that the heat loss from the illumination source 7 is minimised. Therefore, the structure of the two-layer stack 8, 10 (the layer of emitting material 8 and the aluminium plate 10) is designed so as to maximise the emissivity of the stack 8, 10. This may be achieved by adjusting the thickness of layer 8 so that reflection from the layer 8 is minimised through interference effects. Minimum reflection occurs when the thickness (z) of layer 8 is adjusted so that its optical path length, t, satisfies the equation, $t=\sigma^{1/2}(n\lambda/4)$, where n is an odd integer, $\lambda$ is the wavelength of radiation incident on the layer 8 and $\sigma$ is the dielectric constant of the material 8 (this assumes $\mu_0=1$, where $\mu_0$ is the permeability of free space).

The layer of material 8 is preferably a material which has a suitably high bulk emissivity at millimetre wavelengths; preferably equal, or as close as possible, to 1. For example, clay is a suitable material as it has a relatively high bulk emissivity of 0.93. Similarly, fire cement and asbestos fire blanket may also be suitable materials, having bulk emissivities of 0.7 and 0.85 respectively.

Ultimately, the structure of the 'hot' source 7, the particular materials used and thickness of the layers, depends on the particular illumination requirements i.e. the 'hot' source must emit sufficient millimetre wavelength radiation to produce a temperature variance from that of the skin under the clothing which is sufficient to distinguish the particular items of interest in the resulting millimetre wavelength image. Furthermore, this is dependent on the sensitivity of the imager 5 used to detect millimetre wavelength radiation emitted by and reflected from the imaged scene.

For example, a material 8 having an emissivity substantially less than 1 may be used if a higher sensitivity imager 5 is used, as a less contrasting temperature is then required between the subject 3 and the concealed objects. In practice, however, it is more beneficial to use a higher emissivity material, such as clay, so that items under clothing which have an emissivity close to that of skin are more likely to be distinguished in an image. It is also preferable to minimise the thickness of the various layers by careful choice of materials to ensure the 'hot' source 7 is a manageable size.

Typically, the total thickness of the 'hot' source 7 may be less than 10 cm which makes it portable and all the layers are typically 1 m squared in surface area. Another requirement is that the material 8 must be able to stand the heat level in the source 7 which is required in order to achieve a satisfactory temperature contrast at the object 3 to be imaged. Typically, this may be in the region of 300° C. and depends on the particular illumination requirements. The 'hot' source 7 has the property that it is a diffuse illuminator emitting incoherent millimetre wavelength radiation 4 from a large surface area.

Figure 6:
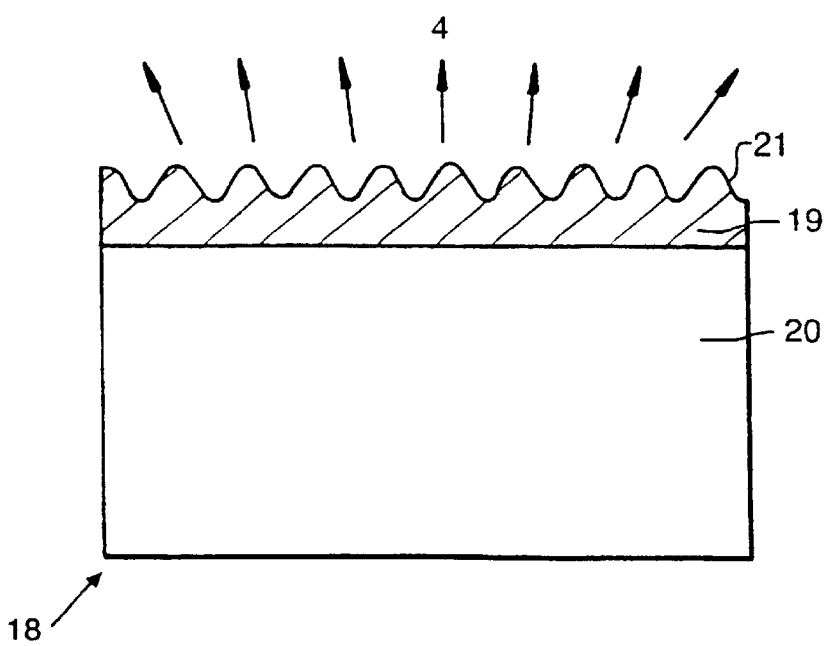

Referring to FIG. 6, in an alternative embodiment the millimetre wave imaging apparatus may comprise a 'cold' source 18 for generating the required contrast in temperature between the surroundings and the subject 3 to be imaged, by decreasing the millimetric temperature of the surroundings. Typically, the cold source 18 may comprise a sheet of radar absorbing material (RAM) 19 (typically graphite loaded foam) which emits very little millimetre wavelength radiation 4 when cooled and therefore has a high absorbtivity. Graphite loaded foam sheets are commercially available and may have a pitted surface 21 (as illustrated in FIG. 4).

The cold source 18 also comprises a refrigeration unit 20 for controlling the temperature of the RAM 19. Ideally, the RAM is cooled to a temperature which achieves the maximum contrast in temperature between the human subject 3 and any concealed objects under the clothing. Referring to FIG. 7, the material 19 may typically be enclosed behind a microwave transparent door 50 which has a low thermal conductivity. For example, the door 50 may be constructed of expanded polystyrene.

In another embodiment, a point source illuminator, with additional optical elements to diffuse the radiation into a large source area, may also be used as a type of 'hot' source as this has the properties necessary to produce the required flux of millimetre wavelength radiation. Typically, a point source may take the form of a semiconductor device, such as a conventional Gunn diode. When operating in standard mode, a Gunn diode produces coherent radiation. However, when certain bias conditions are employed, it is possible to operate the diode in incoherent "noise" mode which provides a suitable source of incoherent millimetre wavelength radiation.

Typically, the power output of a Gunn diode noise source operating in incoherent mode is between 2–3 mW which would be sufficient to produce the required power at the subject 3 to produce a temperature variance from that of the skin when measured through clothing sufficient to distinguish items of interest, such as explosives under clothing. As in FIGS. 1 and 2, the point source illuminator may be placed in the position of 1a, 1b (FIG. 1) for multiple sources. or 1a (FIG. 2) for a single source.

An array of gas discharge noise sources may also be used as a point source illuminator, each individually having a power of typically 2 nW, which is approximately one thousandth of the required total power, depending on the factors mentioned previously.

Alternatively, a suitable 'source' may be produced by using a narrow bandwidth source and sweeping it in frequency at a rate fast compared to the integration time of the imaging camera. The design features of a suitable hot source may also be applicable to the design features of a suitable cold source, and vice versa.

For conventional millimetre wave imaging outdoors the sky provides a source of incoherent millimetre wavelength radiation. However, depending on the particular objects to be imaged the sky may not always provide sufficient illumination. Furthermore, for millimetre wave imaging indoors a source is at least a considerable advantage and may be essential. It is intended that the millimetre wave imaging system of the invention incorporates a source and it is the particular intention of system that it is for indoor use, although it may, of course, also be used out of doors. However, any suitable source must be easily contained within a building and, preferably, be portable. This specifically excludes the sky as a suitable source of millimetre wavelength radiation for the intended purpose.

The operation of a millimetre wave imaging camera 5 for use in the imaging system would be conventional to one skilled in the art. The basic design of a millimetre wave imager 5 is shown in FIG. 8. The imaging camera 5 comprises a primary reflector 22, a sub-reflector 23 and a receiver 24. Incoming radiation 4' reflected from (and emitted by) the subject 3 is reflected by the primary reflector 22 onto the sub-reflector 23 and is focused onto the receiver 24. This is mounted on a pan and tilt system 25 which is controlled, via a feedback loop, by a positioning and data collection control unit 26. The millimetre wavelength image is then processed using a suitable programmed processor 27 and may be displayed on a television monitor 28 or passed to a pattern recognition system.

The image on the television monitor 28 is built up of pixels which are recorded in series as the imager 5 is scanned over a scene (i.e. the subject 3). For example, the imaging camera 5 may use object space scanning to build up a picture by a series of contiguous multiple channel vertical scans.

The imaging camera 5 may be controlled from a computer keyboard (not shown) and a range of thermal sensitivities and fields of view may be used. For example, for a typical imaging camera, the choice of thermal sensitivity may range from 0.8 K to 0.1 K, in square root of 2 steps, resulting in a doubling of the integration time, and therefore frame time, between each step. There is a 64 times increase in frame time for a change in thermal sensitivity of 0.8 K to 0.1 K. The sensitivity may also be increased, without increase in frame time, by increasing the number of channels in the imager 5. Typically, a thermal sensitivity of between 0.2 K and 0.3 K may be appropriate.

Preferably the scan time may be substantially equivalent to real time television rates, but a scan for between 0.5–1 seconds may be suitable for the purpose of imaging people in an airport as they need only remain stationary for this short period of time.

Typically, the millimetre wavelength region is defined as that between 10 GHz and 400 GHz and the imaging camera may have the capability to image scenes at one or more millimetre wave centre frequencies within this range, the specified centre frequency having a bandwidth of typically a few GHz. For example, for a centre frequency of operation of 94 GHz and a bandwidth of a few GHz, the imaging camera may be sensitive to millimetre wavelength radiation between 92 GHz and 96 GHz.

Imaging at a centre frequency of 94 GHz, for example, may be a good compromise between adequate clothing transmission and spatial resolution. Alternatively, the imager may be centre frequency scanable so that a single imaging camera may be used to image at variable centre frequencies. In another embodiment, two or more imaging cameras may be included in the system, each having a different millimetre wave centre frequency, for example 35 GHz and 94 GHz, to give image scenes of differing resolution and contrast i.e. typically between 33 and 37 GHz and 92 and 96 GHz for bandwidths of operation of a few Ghz.

Preferably, the spatial resolution of the imaging camera 5 is such that small objects, such as those typically carried by a person to be imaged, may be resolved. The spatial resolution may therefore preferably be between 1–3 cm. For example, an imaging camera 5 capable of focusing at a distance of 1 m from the receiver 24 and having a spatial resolution of 2 cm may be suitable for use in a millimetre wavelength imaging system for use in an airport. For indoor use, the focusing distance of the receiver 24 is preferably not so large that the system takes up a significant amount of space.

The millimetre wave imaging apparatus enables passive imaging of a scene. In particular, this may be useful for detecting explosives or metallic objects, such as guns, hidden under clothing, as the concealed objects have a temperature at variance from that of the skin when measured through clothing. The apparatus enhances the contrast between the concealed objects and person in the resulting millimetre wave image, enhancing the visibility of the concealed objects to an informed operator.

For the purposes of this patent application, the word 'source' shall refer to means for producing a flux of substantially incoherent millimetre wavelength radiation, capable of generating an increase in the millimetric temperature of the surroundings in a scene ('hot' source), and means for producing a relatively smaller flux, or substantially no flux, of substantially incoherent millimetre wavelength radiation, capable of generating a decrease in the millimetric temperature of the surroundings in a scene ('cold' source). The flux of millimetre wavelength radiation must be substantially incoherent within the bandwidth of operation of the one or more millimetre wave imaging camera.

What is claimed is:

1. Apparatus for detecting at least one object having a millimetric temperature, said at least one object situated in background surroundings having a background millimetric temperature, said apparatus comprising;

means for varying the background millimetric temperature so as to generate a contrast between the background millimetric temperature and the millimetric temperature of the object, and a detector for detecting the contrast between the background millimetric temperature and the millimetric temperature of the at least one object, wherein the means for varying the background millimetric temperature comprise:

an enclosure and at least one source of substantially incoherent millimetre wave radiation, the enclosure and the at least one source arranged to provide substantially uniform illumination of the at least one object.

2. The apparatus of claim 1 wherein the enclosure comprises a reflector for reflecting millimetre wavelength radiation emitted by the at least one source.

3. The apparatus of claim 2 wherein the reflector is a reflecting enclosure having a reflective inner surface.

4. The apparatus of claim 3 wherein the reflecting enclosure is a partial ellipsoid.

5. The apparatus of claim 3 wherein the reflecting enclosure is a room having at least one opening, said at least one opening having an entrance region, wherein the entrance region is coated with an emissive material having an apparent millimetric temperature substantially the same as that of the background millimetric temperature to prevent reflection of millimetre wavelength radiation from outside the enclosure into the enclosure.

6. The apparatus of claim 3 wherein the reflective inner surface is embossed with a dimpled pattern such that millimetre wavelength radiation reflected from the reflective inner surface is diffused.

7. The apparatus of claim 3 wherein the reflecting inner surface is provided by a dimpled reflective covering.

8. The apparatus of claim 1, wherein the at least one source has an emitting surface for emitting substantially incoherent millimetre wavelength radiation, wherein the emitting surface forms part of the enclosure, such that the background surroundings and the at least one object are illuminated substantially uniformly with millimetre wavelength radiation.

9. The apparatus of claim 8, wherein the enclosure is a cubicle having at least one side formed from the emitting surface of the at least one source.

10. The apparatus of claim 1 wherein the detection means comprise at least one millimetre wave imaging camera for detecting millimetre wavelength radiation reflected from and emitted by said at least one object.

11. The apparatus of claim 10 wherein the at least one millimetre wave imaging camera has at least one millimetre wave centre frequency of operation.

12. The apparatus of claim 11, said at least one camera comprises at least two millimetre wave imaging cameras having substantially different millimetre wave centre frequencies of operation.

13. The apparatus of claim 10 wherein the at least one millimetre wave imaging camera is mounted outside the enclosure.

14. The apparatus of claim 10 wherein the at least one millimetre wave imaging camera is mounted within the enclosure.

15. The apparatus of claim 10 wherein the at least one millimetre wave imaging camera has an associated processor and television monitor for generating a millimetre wavelength image of said at least one object.

16. The apparatus of claim 1 wherein the at least one source comprises;
a layer of emissive material, having an optical thickness t, for emitting millimetre wavelength radiation and
heating means for increasing the temperature of the layer of emissive material,
whereby increasing the temperature of the layer of emissive material gives rise to an increase in the background millimetric temperature.

17. The apparatus of claim 16 wherein the heating means comprise at least one heating element.

18. The apparatus of claim 17 wherein the at least one source further comprises a metal layer,
wherein the metal layer and the layer of emissive material form a structure having an emissivity, $\epsilon$, in the millimetre wavelength region,
and wherein the optical thickness, t, of the layer of emissive material is such that the emission of millimetre wavelength radiation from said structure is substantially maximised.

19. The apparatus of claim 18 wherein the emissivity, $\epsilon$, of the structure is between 0.5 and 1.0.

20. The apparatus of claim 19 wherein the emissivity, $\epsilon$, of the structure is substantially equal to 1.0.

21. The apparatus of claim 19 wherein the metal layer is aluminium.

22. The apparatus of claim 16 wherein the emissive material is one of clay tiles, asbestos fire blanket and fire cement.

23. The apparatus of claim 16 wherein the at least one source further comprises insulation for reducing the emission of infrared radiation from the at least one source.

24. The apparatus of claim 23 wherein the insulation comprise a fibreglass mat.

25. The apparatus of claim 16 wherein the at least one source further comprises at least one additional metal layer for internally reflecting millimetre wavelength radiation emitted from the emissive material, such that the emission of millimetre wavelength radiation from the emitting surface of the at least one source is substantially maximised.

26. The apparatus of claim 1, wherein the at least one source comprises;
a layer of material for emitting millimetre wavelength radiation and
a cooler for decreasing the temperature of the emissive material,
whereby decreasing the temperature of the layer of material gives rise to a decrease in the background millimetric temperature.

27. The apparatus of claim 26 wherein the layer of material is radar absorbing material (RAM).

28. The apparatus of claim 27 wherein the cooler comprises a refrigeration unit.

29. The apparatus of claim 26, wherein the at least one source also comprises a millimetre radiation transparent layer enclosing the layer of emitting material.

30. The apparatus of claim 1, wherein the at least one source Gunn diode for emitting substantially incoherent millimetre wavelength radiation.

31. The apparatus of claim 1, wherein the at least one source comprises a plurality of gas discharge noise sources for emitting substantially incoherent millimetre wavelength radiation.

32. The apparatus of claim 30, and further comprising at least one optical element for diffusing the emitted millimetre wavelength radiation.

33. constructed and adapted to be used in the millimetre wave imaging apparatus of claim 1 comprising;
a layer of emissive material, having an optical thickness t, for emitting millimetre wavelength radiation; and
a heater for increasing the temperature of the layer of emissive material, whereby increasing the temperature of the layer of emissive material gives rise to an increase in the background millimetric temperature.

34. The source of claim 33, wherein the at least one source further comprises a metal layer, the metal layer and the layer of emissive material forming a structure having an emissivity, $\epsilon$, in the millimetre wavelength region, wherein the optical thickness, t, of the layer of emissive material is such that the emission of millimetre wavelength radiation from said structure is substantially maximised.

* * * * *